United States Patent [19]

Minefuji

[11] Patent Number: 5,015,079
[45] Date of Patent: May 14, 1991

[54] COPYING LENS SYSTEM
[75] Inventor: Nobutaka Minefuji, Tokyo, Japan
[73] Assignee: Asahi Kogaku Kogyo Kabushiki Kaisha, Tokyo, Japan
[21] Appl. No.: 386,486
[22] Filed: Jul. 28, 1989
[30] Foreign Application Priority Data Jul. 30, 1988 [JP] Japan .................................. 63-191159
May 10, 1989 [JP] Japan .................................. 1-116461

[51] Int. Cl.$^5$ ............................................. G02B 9/36
[52] U.S. Cl. ............................................. 350/470
[58] Field of Search ........................................ 350/470

[56] References Cited

U.S. PATENT DOCUMENTS 2,518,719  8/1950  Reiss ..................................... 350/470
2,865,253 12/1958  Thielens .

FOREIGN PATENT DOCUMENTS 57-7411   2/1982  Japan .
59-45418  3/1984  Japan .
59-90811  5/1984  Japan .
62-294214 12/1987 Japan .
63-195617 8/1988  Japan .
487453    6/1938  United Kingdom .

Primary Examiner—Bruce Y. Arnold
Assistant Examiner—Rebecca D. Gass
Attorney, Agent, or Firm—Sughrue, Mion, Zinn, Macpeak & Seas

[57] ABSTRACT

A copying lens system composed of a four-unit-four-element configuration including, in order from the object side, a first lens element of positive meniscus having a convex surface directed toward an object, a second lens element of negative meniscus having a convex surface directed toward the object, a third lens element of negative meniscus having a convex surface directed toward an image, and a fourth lens element of positive meniscus having a convex surface directed toward the image. In this configuration, the first lens element and the fourth lens element have the same geometric shape, and are disposed symmetrically with respect to a central diaphragm stop. The second and third lens elements also have the same geometric shape, and are also disposed symmetrically with respect to the central diaphragm stop. This provides an overall symmetrical configuration which can compensate for various aberrations.

12 Claims, 10 Drawing Sheets

COPYING LENS SYSTEM

BACKGROUND OF THE INVENTION

The present invention relates to a copying lens system, and, more particularly, to a copying lens system that has a brightness of approximately $F_{NO}$ 1:6.5 –8, that covers a wide field of up to approximately 25–30 degrees in terms of half-view angle ($\omega$), and that is capable of copying over a magnification range of 0.64 (reduction) through 1x (life size) to 1.42 (enlargement).

Increased demand for reducing the size and cost of copying machines has required, correspondingly, the designing of smaller and less costly copying lens systems. A copying lens system known in the art and used for this purpose is a so-called "split dagor" type lens that has a symmetrical six-element composition, and which covers a wide field of up to approximately 25–30 degrees in terms of half-view angle ($\omega$). This type of lens is described in several patents such as JP-B-49-28029 (the term "JP-B" as used herein means an "examined Japanese patent publication") and (JP-A-51-120723 (the term "JP-A" as used herein means an "unexamined published Japanese patent application"). Known examples of a lens system having a symmetrical four-element composition that is compact and manufactured inexpensively are described in U.S. Pat. No. 2,865,252, JP-A-59-45418, etc.

With the recent advances in electrophotography technology, photoreceptors having an increased sensitivity have been developed, and the use of copying lenses having a brightness in the range of $F_{NO}$ 1:7–8 has become popular. A split dagor type lens system composed of six lens elements symmetrically arranged is capable of providing brightness in the range of approximately $F_{NO}$ 1:4.5 to 1:5.6. However, this range is insufficient to satisfy fully the need for size and cost reduction of recent copier models that employ a lens system having a brightness in the range of $F_{NO}$ 1:7–8.

The lens system of a symmetrical four-element composition described in U.S. Pat. No. 2,865,252 covers a wide field of up to approximately 30 degrees in terms of half-view angle, but this suffers from the disadvantage of not only low brightness (ca. $F_{NO}$ 1:10), but also high machining cost due to the small radius of curvature compared to the focal length. The lens system described in JP-A-59-45418 is improved in brightness (ca. $F_{NO}$ 1:8), but field coverage is only capable of covering a half-view angle of up to approximately 20 degrees.

SUMMARY OF THE INVENTION

Therefore, an object of the present invention is to solve the aforementioned problems of the prior art by providing a copying lens system that has a simple lens arrangement which is reduced in size and cost. The inventive copying lens system covers a wide field of up to 25–30 degrees in terms of half-view angle ($\omega$), and yet copies over a magnification range of from life size to either enlarged or reduced size in a balanced way, with various aberrations being compensated for effectively.

This and other objects can be attained by a copying lens system of a four-unit-four-element composition which comprises, in order from the object side, a first lens element of positive meniscus having a convex surface directed toward the object, a second lens element of negative meniscus having a convex surface directed toward the object, a third lens element of negative meniscus having a convex surface directed toward the image, and a fourth lens element of positive meniscus having a convex surface directed toward the image, and in which this lens system satisfies the following conditions:

$$0.55 < f_1/f_M, f_4/f_M < 0.75 \tag{1}$$

$$-1.20 < f_2/f_M, f_3/f_M < -0.80 \tag{2}$$

It is more preferable to set the lower limit of the condition (1) to 0.61 as follows:

$$0.61 < f_1/f_M, f_4/f_M < 0.75 \tag{1'}$$

While the object of the invention can be attained by the system described above, preferably the two negative meniscus lens elements (i.e., the second and third lens elements) also satisfy the following conditions:

$$0.12 < r_3/f_M, -r_6/f_M < 0.35 \tag{3}$$

$$0.1 < d_4/f_M < 0.2 \tag{4}$$

To compensate effectively for aberrations, the lens system preferably satisfies the following additional conditions:

$$0.004 < \sum_{i=1}^{4} \frac{1}{n_i \cdot f_i} < 0.009 \tag{5}$$

$$\left| \sum_{i=1}^{4} \frac{1}{v_i \cdot f_i} \right| < 0.0005 \tag{6}$$

In another aspect, the invention provides a copying lens system of a four-unit-four-element composition which comprises, in order from the object side, a first lens element of positive meniscus having a convex surface directed toward the object, a second lens element of negative meniscus having a convex surface directed toward the object, a third lens element of negative meniscus having a convex surface directed toward the image, and a fourth lens element of positive meniscus having a convex surface directed toward the image, and in which the lens system satisfies the following conditions:

$$-0.79 < f_1/f_2, f_4/f_3 < -0.67$$

$$0.19 < r_1/f_M, -r_8/f_M < 0.28$$

$$1.46 < r_1/r_4, r_8/r_5 < 1.67$$

$$0.36 < d_4/\Sigma d < 0.45$$

The symbols used in conditions (1)–(10) have the following definitions:

$f_M$: the focal length of the overall lens system;
$f_i$: the focal length of the i-th lens element;
$r_i$: the radius of curvature of the i-th surface as counted from the object side;
$d_i$: the thickness of the i-th lens element as counted from the object side, or the aerial distance between the i-th and (i+1)-th lens elements;
$n_i$: the refractive index at the d-line of the lens element defined by the i-th and (i+1)-th lens surfaces;
$v_i$: the Abbe number of the lens element defined by the i-th and (i+1)-th lens surfaces;
$\Sigma d$: the overall length of the lens system.

In a preferred embodiment of any one of the lens systems described above, the first and fourth lens elements have the same geometric shape, and are disposed symmetrically with respect to the central diaphragm stop. This is equally true for the second and third lens elements, thereby providing an overall symmetrical configuration.

The most important feature of the invention is that a copying lens system which is composed of a simple four-unit-four-element configuration is capable of covering a wide field of up to approximately 25–30 degrees in terms of half-view angle ($\omega$), in contrast to the prior art systems that have required a minimum of six lens elements.

DETAILED DESCRIPTION OF THE PREFERRED EMBODIMENTS

Figure 1:
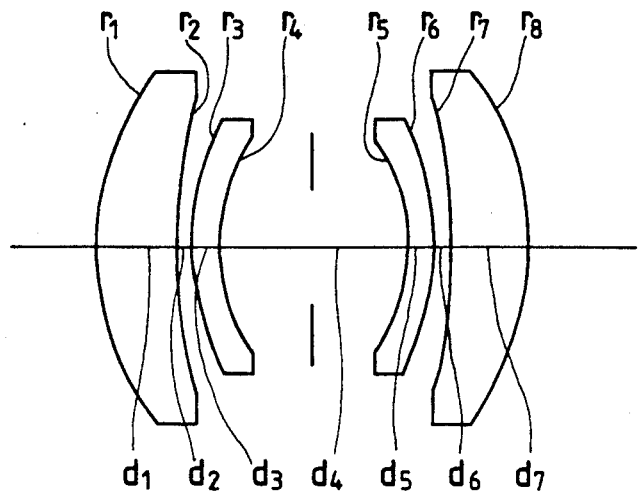
FIGS. 1, 5, 9, 13, and 17 are simplified cross-sectional views of the lens systems constructed in accordance with Examples 1, 2, 3, 4, and 5, respectively, of the invention.
Figure 2:
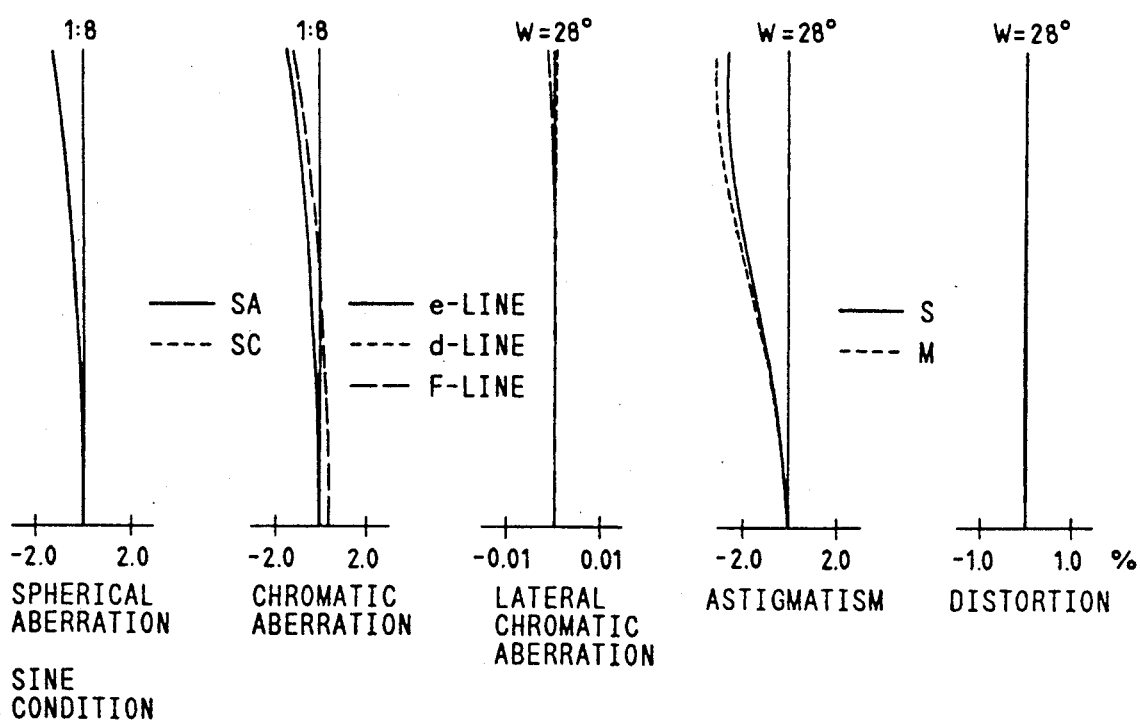
FIGS. 2, 6, 10, 14, and 18 are graphs plotting the aberration curves obtained at a magnification of 1.0× with the lens systems of Examples 1, 2, 3, 4, and 5, respectively.
Figure 3:
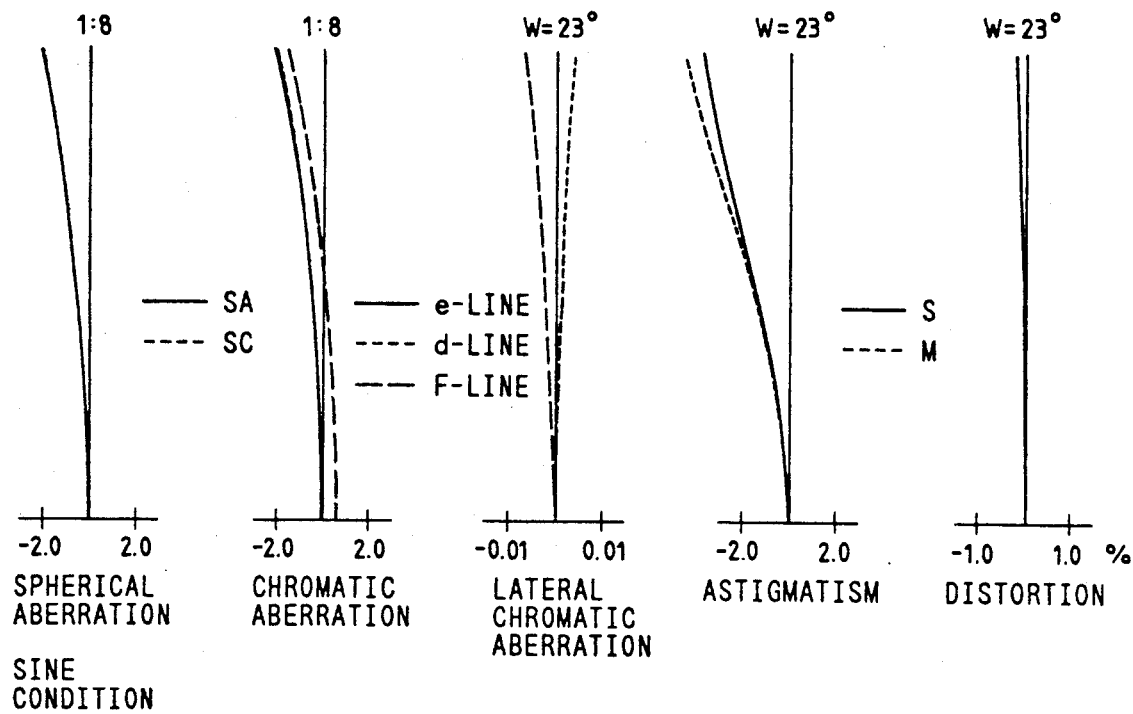
FIGS. 3, 7, 11, 15, and 19 are graphs plotting the aberration curves obtained at a magnification of 1.42× with the lens systems of Examples 1, 2, 3, 4, and 5, respectively.
Figure 4:
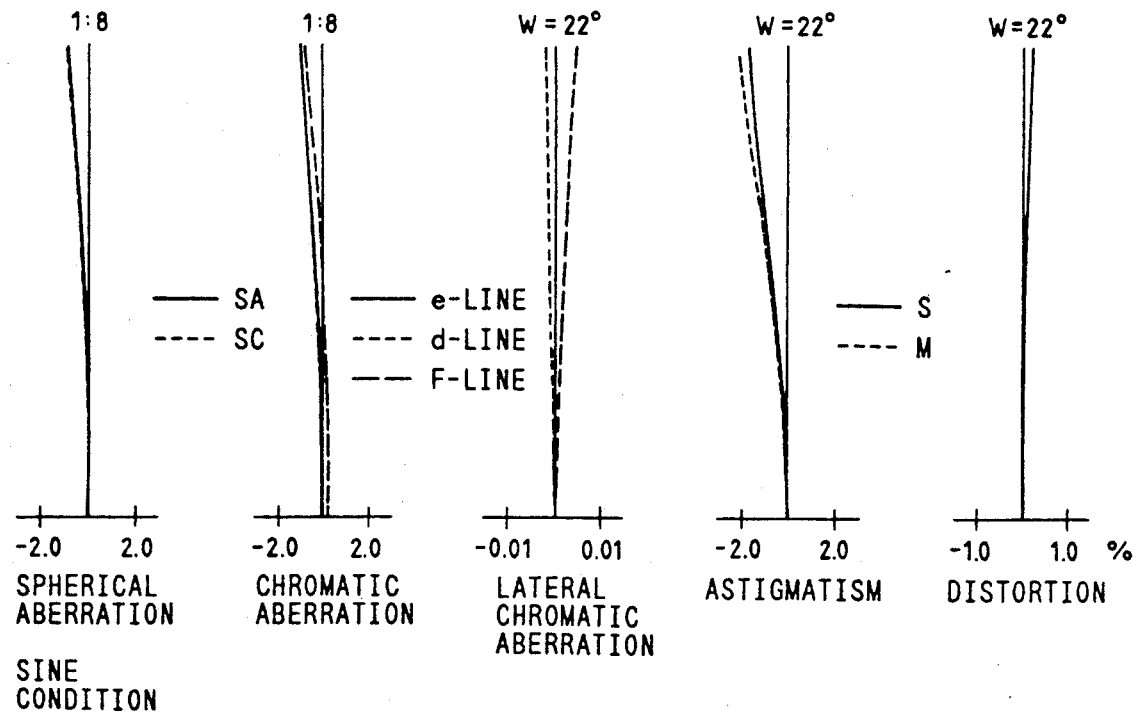
FIGS. 4, 8, 12, 16, and 20 are graphs plotting the aberration curves obtained at a magnification of 0.64× with the lens systems of Examples 1, 2, 3, 4, and 5, respectively.
Figure 5:
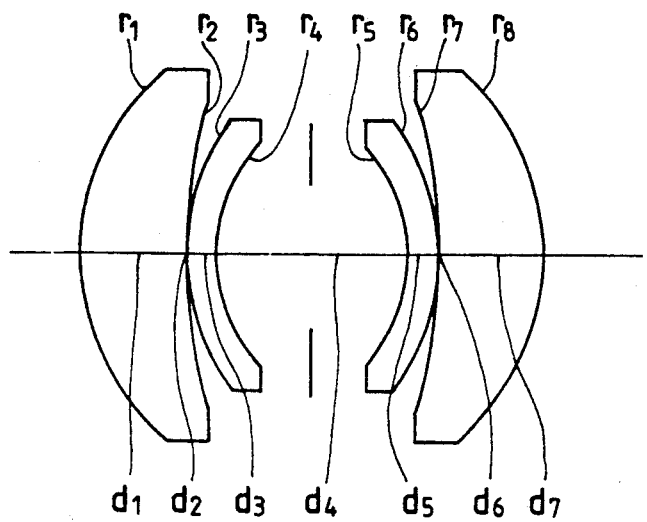
Figure 6:
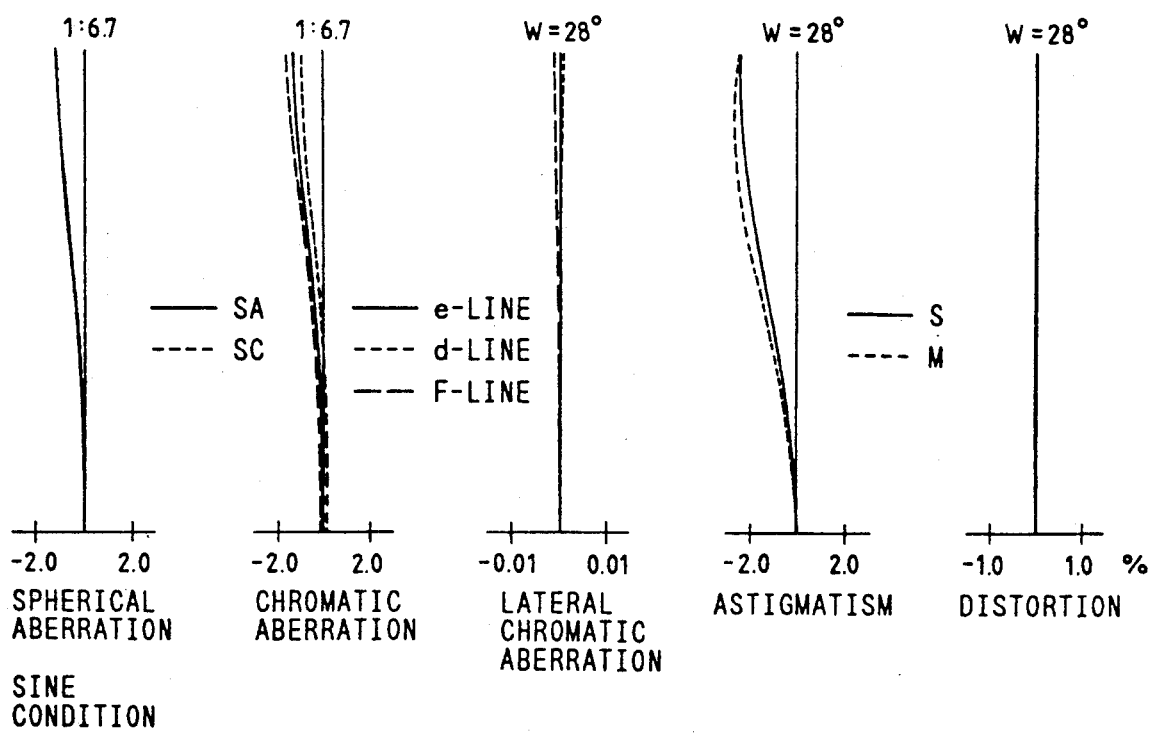
Figure 7:
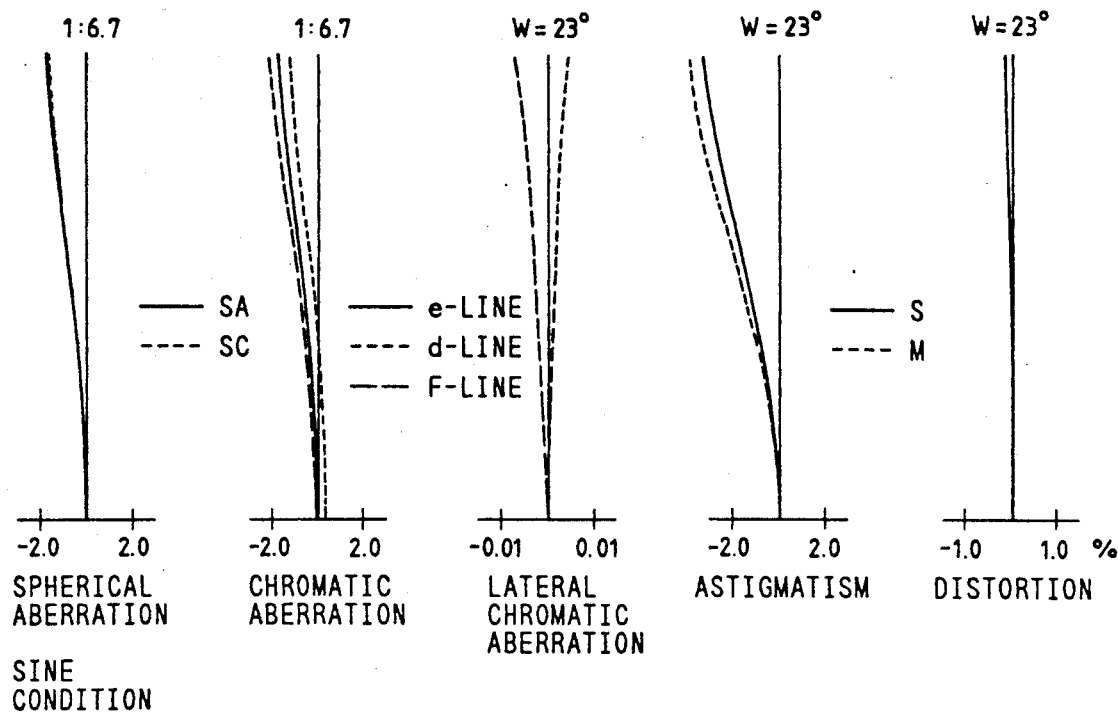
Figure 8:
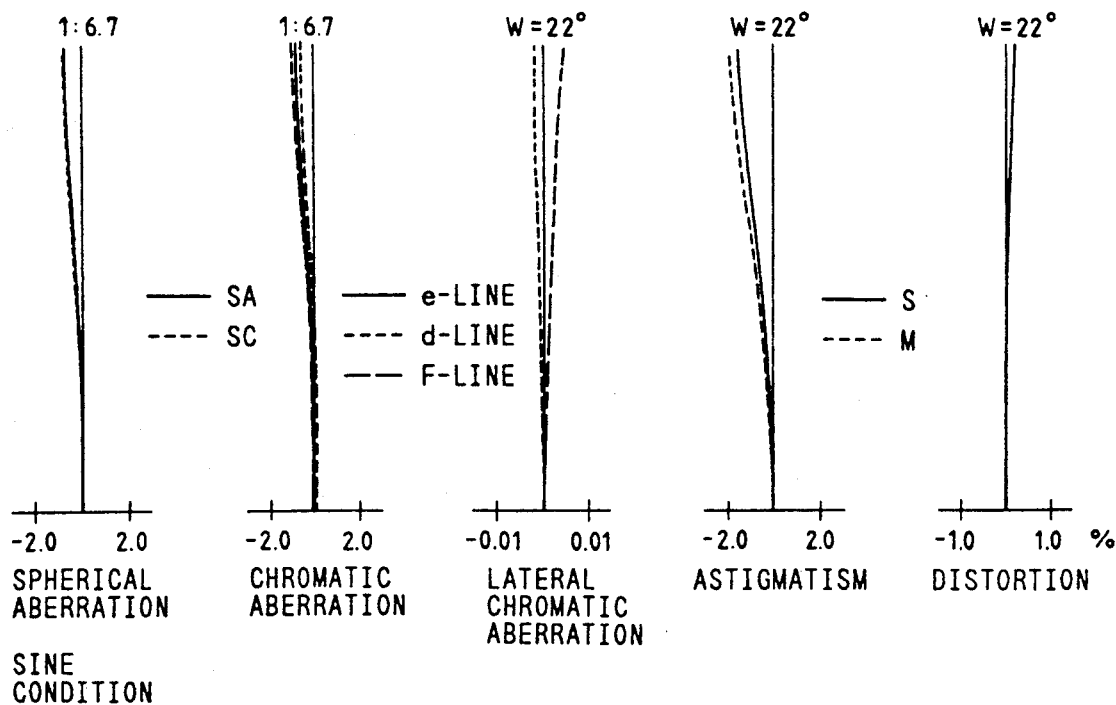
Figure 9:
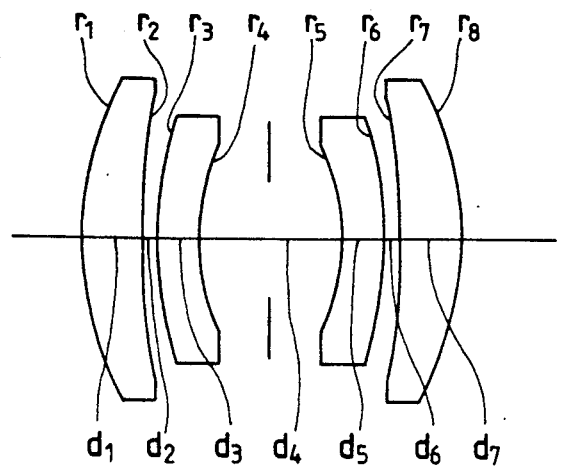
Figure 10:
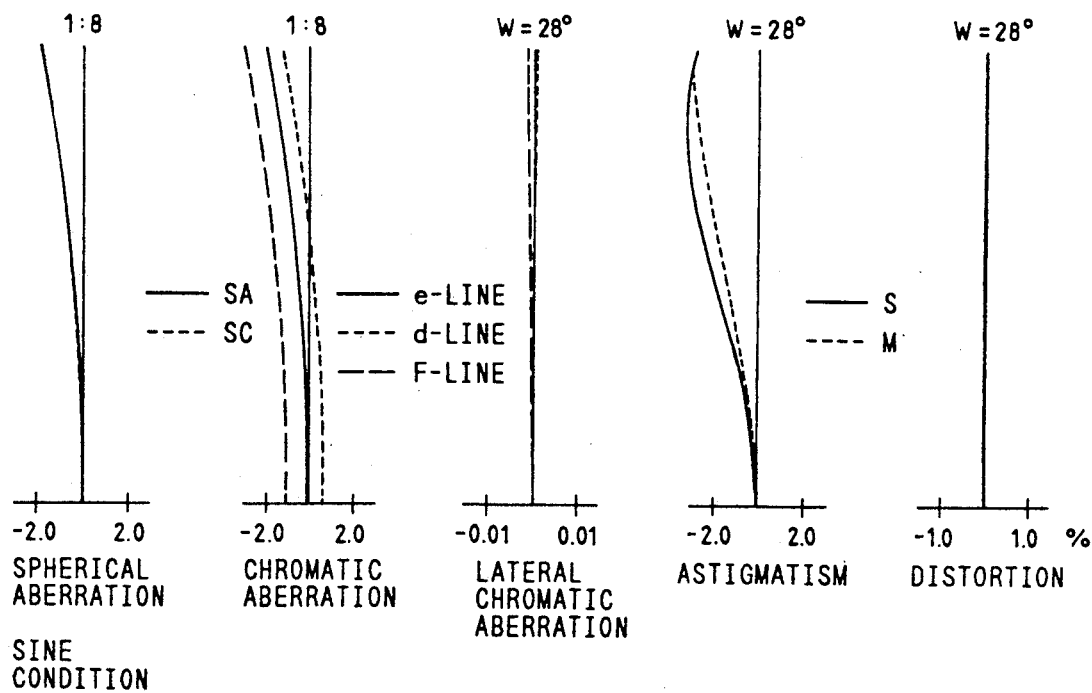
Figure 11:
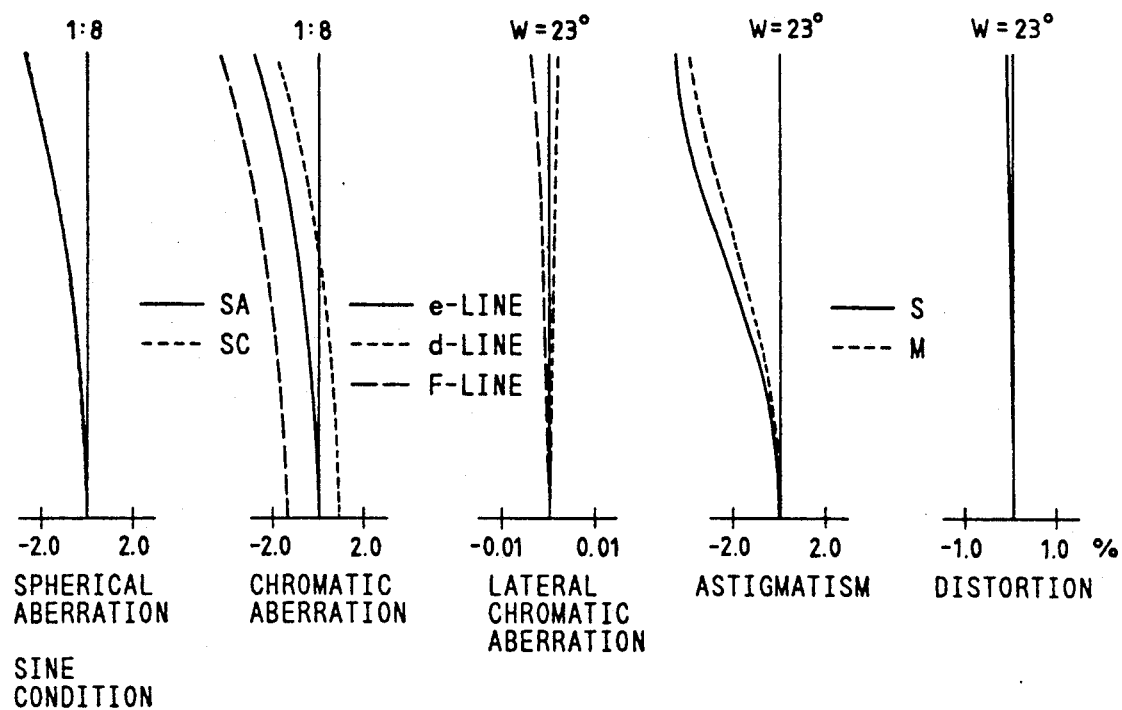
Figure 12:
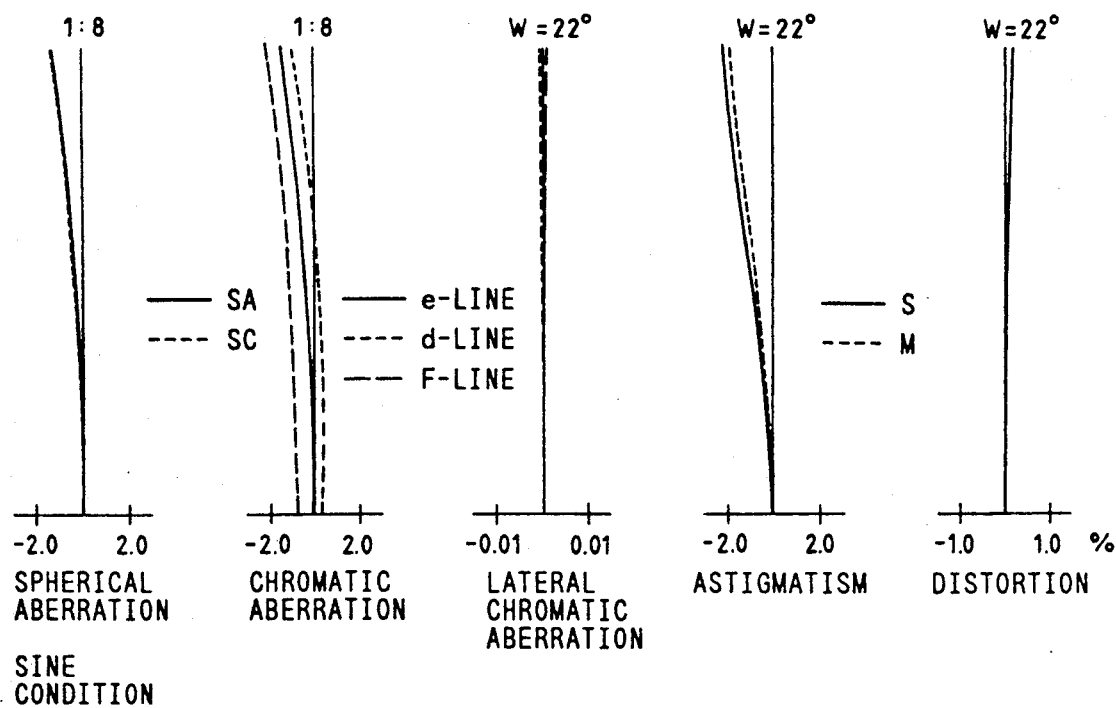
Figure 13:
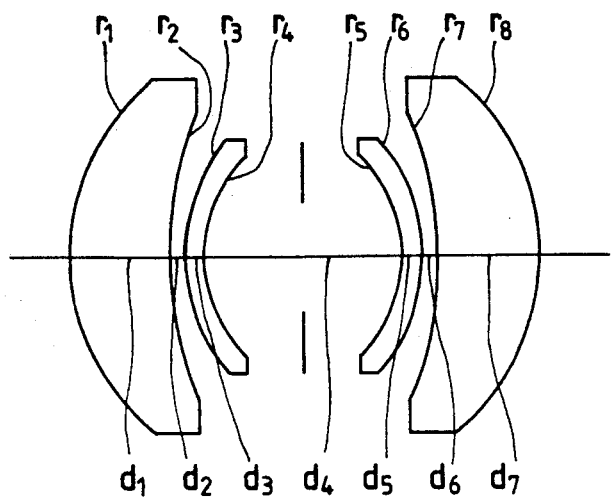
Figure 14:
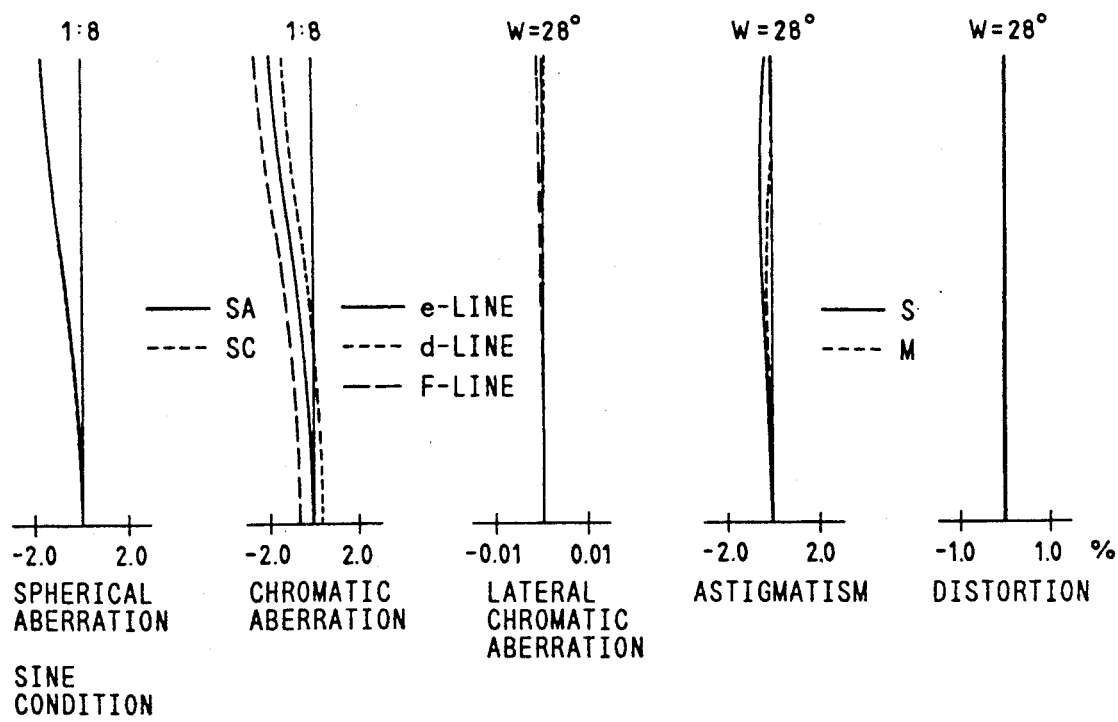
Figure 15:
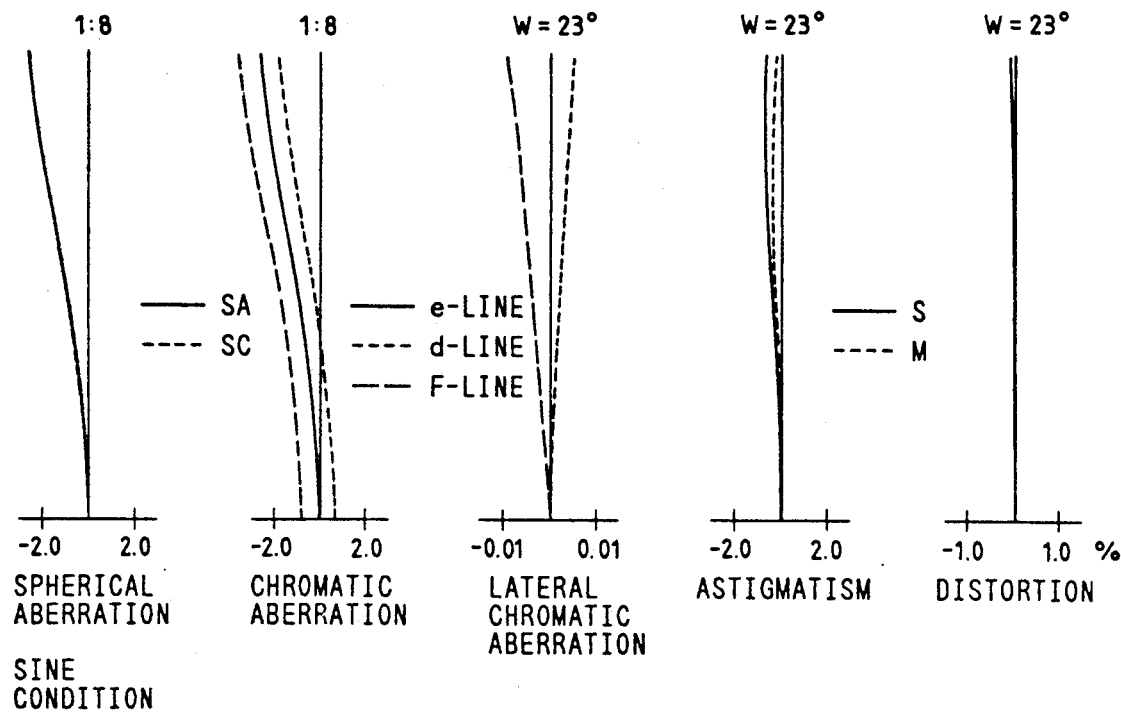
Figure 16:
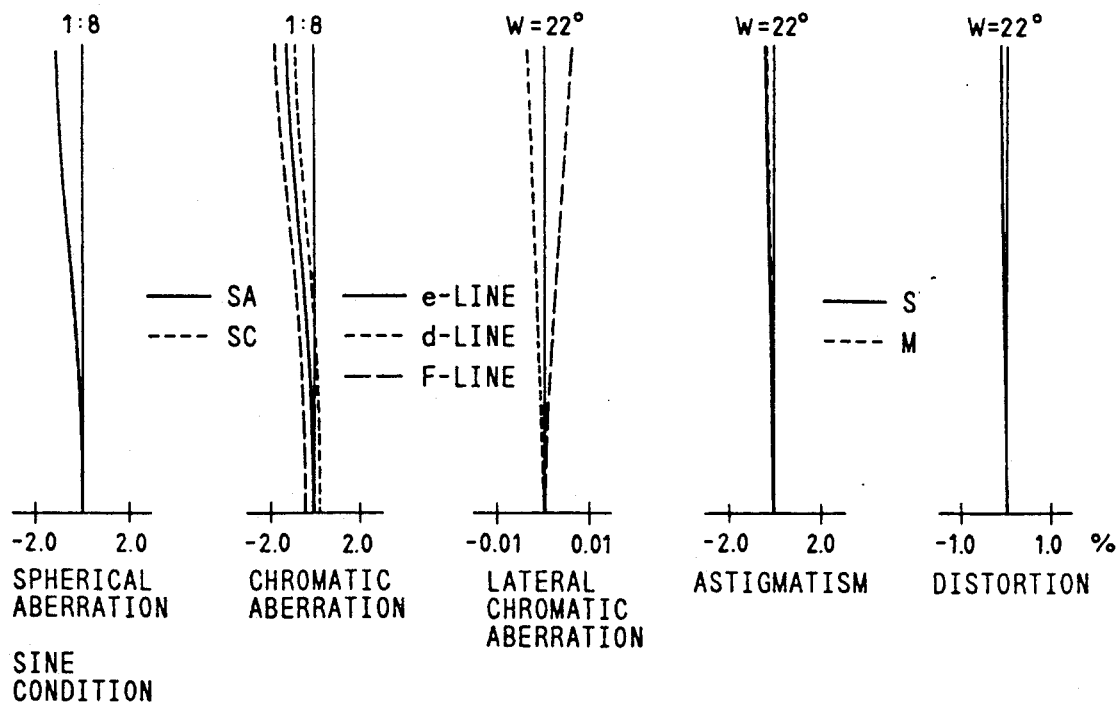
Figure 17:
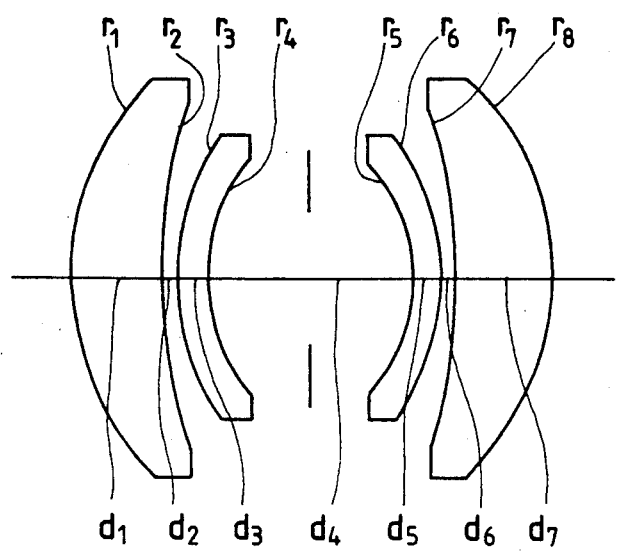
Figure 18:
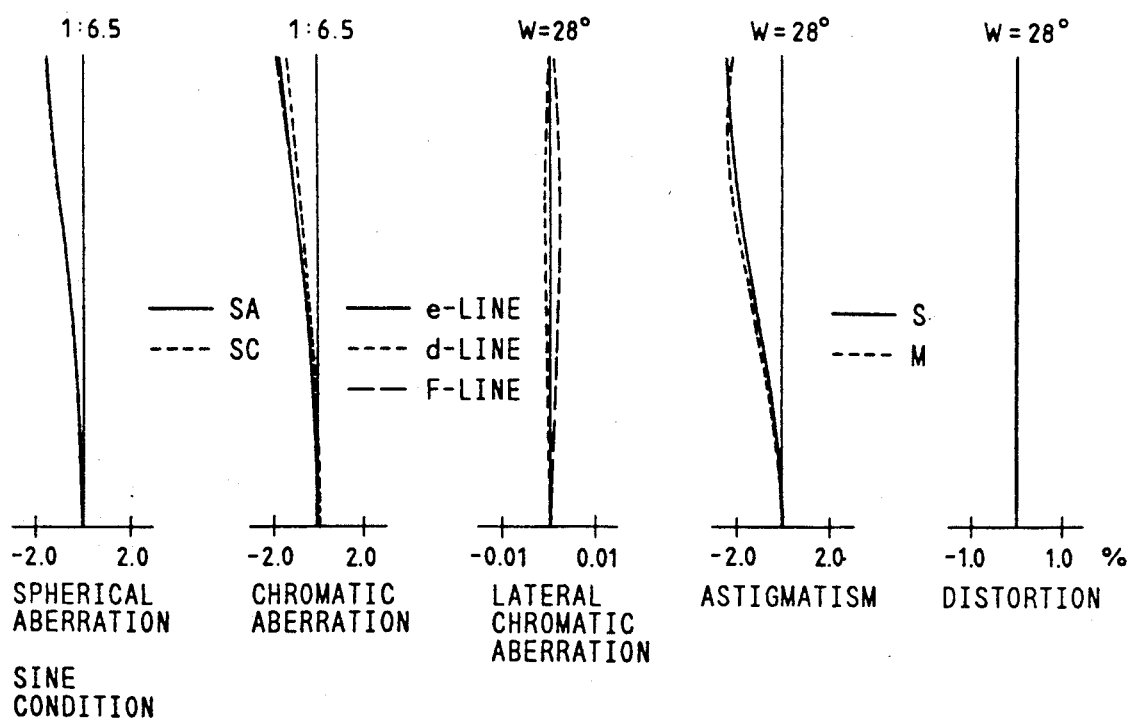
Figure 19:
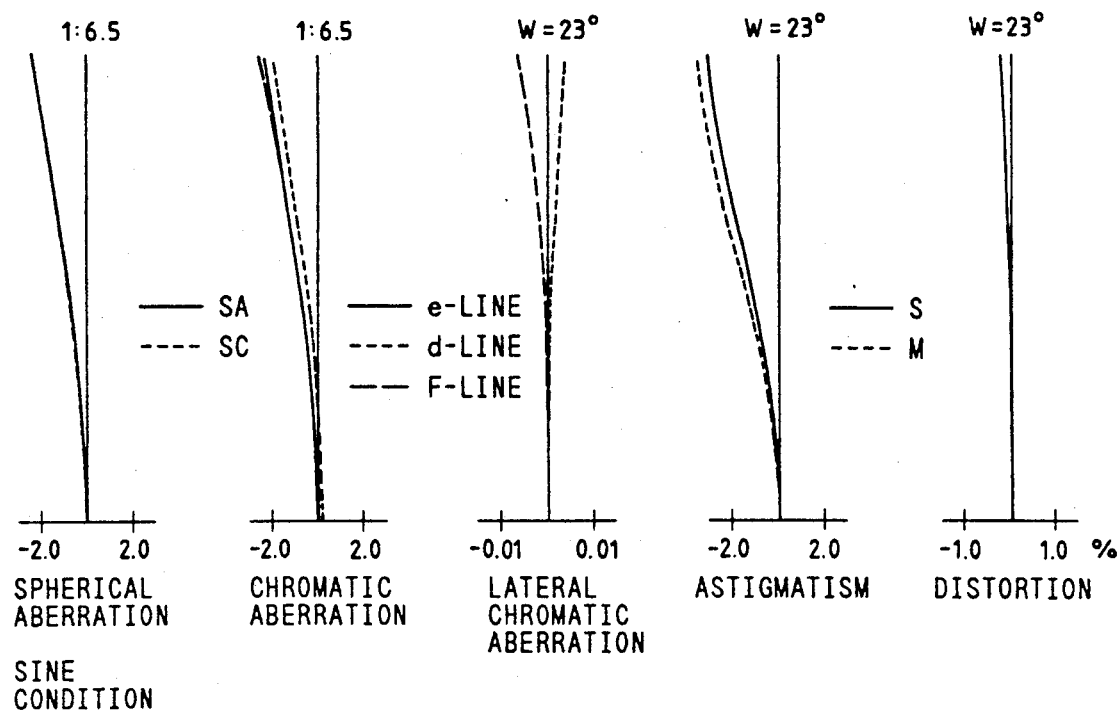
Figure 20:
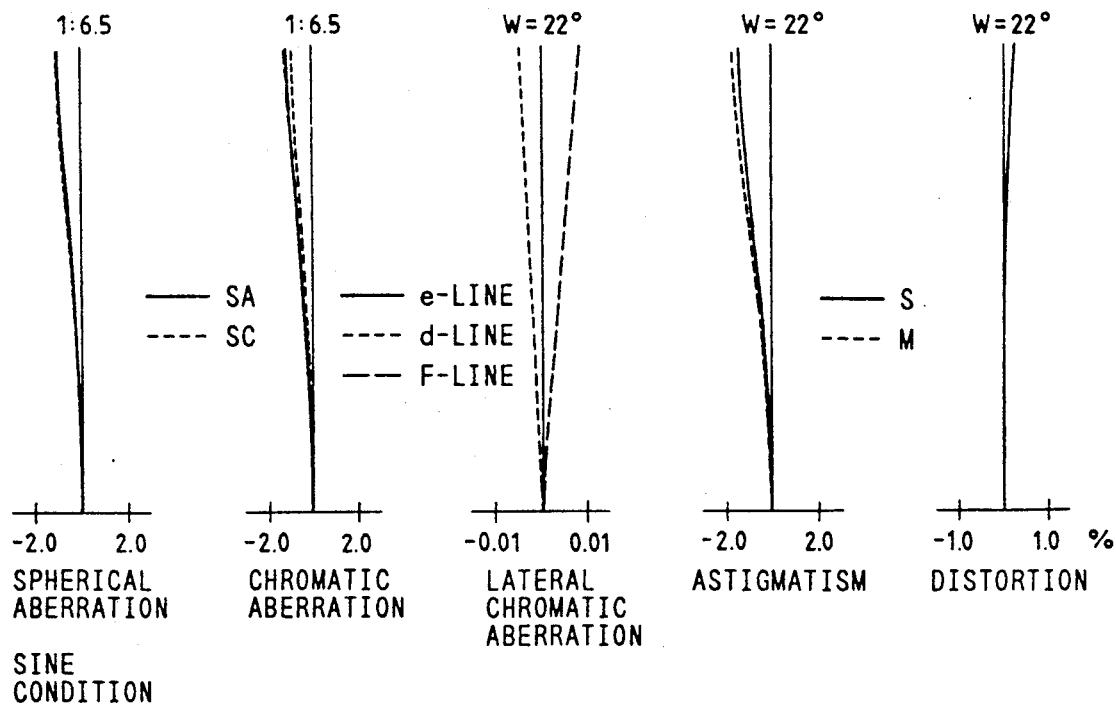

The conditions, as defined above, to be satisfied by the copying lens system of the present invention are described hereinafter.

Condition (1) defines the required ratio of the focal length of each of the positive meniscus lens elements (i.e., the first and fourth lens elements) to that of the overall system. If the upper limit of this condition is met or exceeded, the power of the positive lenses becomes so weak that spherical aberration and astigmatism will be overcompensated for. If the lower limit of condition (1) is not exceeded, the power of the positive lenses becomes strong, and the resulting decrease in the radii of curvature of their surfaces makes it difficult to achieve effective compensation for spherical aberration and astigmatism. Increasing the radius of curvature is not preferred from an economic standpoint since optical materials having a high refractive index then are required.

Condition (2) defines the required ratio of the focal length of each of the negative meniscus lens elements (i.e., the second and third lens elements) to that of the overall system. If this condition's upper limit is met or exceeded, the power of the negative lenses becomes very strong and coma flare will increase so rapidly as to reduce image contrast at a resolution of 5–10 line pairs per millimeter. Obviously resolution is important for a copying lens system. If the lower limit of Condition (2) is not exceeded, it is difficult to compensate for spherical aberration and astigmatism in a balanced way.

Conditions (3) and (4) define the required shape and arrangement of the two negative meniscus lens elements (i.e., the second and third lens elements). By arranging the two negative meniscus lens elements concentrically with respect to the centrally positioned diaphragm stop, with an appropriate space provided between the opposing surfaces of these lens elements, a copying lens system is formed that produces a flat image plane, and a high contrast wide angle.

Condition (3) relates to the shape of the two negative meniscus lens elements. If the upper limit of this condition is met or exceeded, compensating effectively for spherical aberration and astigmatism is difficult. If the lower limit of Condition (3) is not exceeded, not only will astigmatism be overcompensated for, but also the radii of curvature of the third and sixth surfaces will become too small to perform efficient machining operations.

Condition (4) relates to the arrangement of the two negative meniscus lens elements. If the upper limit of this condition is met or exceeded, not only will spherical aberration and coma be overcompensated for, but also the overall lens system will become too large to meet the size reduction requirement. If the lower limit of Condition (4) is not exceeded, effective compensation for aberrations becomes difficult to realize.

Condition (5) defines the required Petzval sum to obtain a flat image plane in a wide image circle. This is one of the most important requirements for an effective copying lens system. If the upper limit of this condition is met or exceeded, the Petzval sum becomes too large to obtain a flat image plane. If the lower limit of Condition (5) is not exceeded, the power of the four lens elements is increased so much that it is difficult to compensate for spherical aberration, coma, and other aberrations in a balanced way.

Condition (6) defines requirements necessary to achieve effective compensation for chromatic aberration. By making the positive and negative lens elements of optical materials that are combined satisfy Condition (6), chromatic aberration can be reduced.

Condition (7) defines the required ratio of the focal length of positive meniscus lens elements (i.e., the first and fourth lens elements) to that of negative meniscus lens elements (i.e., the second and third lens elements). By properly distributing lens power between the set of positive lens elements and the set of negative lens elements, compensating for spherical aberration and astigmatism in a balanced way becomes possible. If the upper limit of Condition (7) is met or exceeded, spherical aberration is increased, and effectively compensating for chromatic aberration is difficult. If the lower limit of Condition (7) is not exceeded, not only will astigmatism be increased, but also it will be difficult to obtain a flat image plane at a wide angle.

Condition (8) defines the required shape of the positive meniscus lens elements. If the upper limit of this condition is met or exceeded, not only will spherical aberration be increased, but also effective compensation for coma flare due to extra-axial light will become difficult, thus making satisfactory contrast impossible. If the lower limit of Condition (8) is not exceeded, not only will spherical aberration be overcompensated for, but also the radii of curvature of the first and eighth surfaces will become so small that machining costs will increase. This certainly is not desirable from an economic standpoint.

Condition (9) defines the required ratio of the curvature radii of the convex surfaces on positive meniscus lens elements to those of concave surfaces on negative meniscus lens elements in order to obtain both a satisfactory flat image plane at wide angle, and a satisfactory depth of focus. These are two critical requirements for an effective copying lens system. If the upper limit of Condition (9) is met or exceeded, curvature of the field will be overcompensated for. If the lower limit of Condition (9) is not exceeded, curvature of the field will be undercompensated for. Thus, a flat image plane cannot be obtained if Condition (9) is not met.

Condition (10) defines the required ratio of the distance between the two negative meniscus lens elements to the overall length of the lens system. If the upper limit of this condition is met or exceeded, not only will spherical aberration be overcompensated for, but also the diaphragm will widen considerably to increase the overall length of the lens system. This is not desirable in terms of size and cost reduction. If the lower limit of Condition (10) is not exceeded, not only spherical aberration, but also coma flare due to extra-axial light will increase rapidly. In addition, effectively compensating for chromatic aberration becomes difficult.

Five examples of the present invention are described below with reference to data sheets and appropriate drawings briefly described earlier, in which: $F_{NO}$ denotes an aperture ratio; $f_M$, the focal length of the overall lens system; $\omega$, half-view angle; r, the radius of curvature of an individual lens surface; d, lens thickness, or the axial distance between lenses; n, the refractive index of an individual lens at the d-line; and $\nu$, the Abbe number of an individual lens. All the numerical figures in Conditions (1)–(10) are calculated based on the d-line.

EXAMPLE 1

$F_{NO}=1:8$; $F_M=100.00$; $\omega=28°\sim22°$.

| Surface No. | r | d | n | $\nu$ |
|---|---|---|---|---|
| 1 | 23.032 | 6.66 | 1.65844 | 50.9 |
| 2 | 51.010 | 1.34 | | |
| 3 | 22.113 | 2.24 | 1.78472 | 25.7 |
| 4 | 15.319 | 15.51 | | |
| 5 | −15.319 | 2.24 | 1.78472 | 25.7 |
| 6 | −22.113 | 1.34 | | |
| 7 | −51.010 | 6.66 | 1.65844 | 50.9 |
| 8 | −23.032 | | | |

$f_1/f_M = f_4/f_M = 0.580$ (1)

$f_2/f_M = f_3/f_M = -0.737$ (2)

$r_3/f_M = -r_6/f_M = 0.221$ (3)

$d_4/f_M = 0.155$ (4)

$\sum_{i=1}^{4} \frac{1}{n_i \cdot f_i} = 0.0056$ (5)

$\left| \sum_{i=1}^{4} \frac{1}{\nu_i \cdot f_i} \right| = 0.00038$ (6)

$f_1/f_2 = f_4/f_3 = -0.787$ (7)

$r_1/f_M = -r_8/f_M = 0.230$ (8)

$r_1/r_4 = r_8/r_5 = 1.503$ (9)

$d_4/\Sigma d = 0.431$ (10)

EXAMPLE 2

$F_{NO}=1:6.7$; $f_M=100.00$; $\omega=28°\sim22°$.

| Surface No. | r | d | n | $\nu$ |
|---|---|---|---|---|
| 1 | 19.828 | 8.43 | 1.51633 | 64.1 |
| 2 | 43.502 | 0.11 | | |
| 3 | 17.756 | 2.38 | 1.69895 | 30.1 |
| 4 | 12.855 | 15.87 | | |
| 5 | −12.855 | 2.38 | 1.69895 | 30.1 |
| 6 | −17.756 | 0.11 | | |
| 7 | −43.502 | 8.43 | 1.51633 | 64.1 |
| 8 | −19.828 | | | |

$f_1/f_M = f_4/f_M = 0.627$ (1)

$f_2/f_M = f_3/f_M = -0.827$ (2)

$r_3/f_M = -r_6/f_M = 0.178$ (3)

$d_4/f_M = 0.159$ (4)

$\sum_{i=1}^{4} \frac{1}{n_i \cdot f_i} = 0.0068$ (5)

$\left| \sum_{i=1}^{4} \frac{1}{\nu_i \cdot f_i} \right| = 0.00031$ (6)

$f_1/f_2 = f_4/f_3 = -0.758$ (7)

$r_1/f_M = -r_8 f_M = 0.198$ (8)

$r_1/r_4 = r_8 r_5 = 1.542$ (9)

$d_4/\Sigma d = 0.421$ (10)

EXAMPLE 3

$F_{NO}=1:8$; $f_M=100.00$; $\omega=28°\sim22°$.

| Surface No. | r | d | n | $\nu$ |
|---|---|---|---|---|
| 1 | 27.546 | 5.46 | 1.65160 | 58.5 |
| 2 | 78.244 | 1.14 | | |
| 3 | 31.838 | 3.64 | 1.62004 | 36.3 |
| 4 | 18.848 | 12.58 | | |
| 5 | −18.848 | 3.64 | 1.62004 | 36.3 |
| 6 | −31.838 | 1.14 | | |
| 7 | −78.244 | 5.46 | 1.65160 | 58.5 |
| 8 | −27.546 | | | |

$f_1/f_M = f_4/f_M = 0.623$ (1)

$f_2/f_M = f_3/f_M = -0.830$ (2)

$r_3/f_M = -r_6/f_M = 0.318$ (3)

$d_4/f_M = 0.126$ (4)

$\sum_{i=1}^{4} \frac{1}{n_i \cdot f_i} = 0.0046$ (5)

$\left| \sum_{i=1}^{4} \frac{1}{\nu_i \cdot f_i} \right| = 0.00012$ (6)

$f_1/f_2 = f_4/f_3 = -0.751$ (7)

$r_1/f_M = r_8/f_M = 0.275$     (8)

$r_1/r_4 = r_8/f_5 = 1.461$     (9)

$d_4/\Sigma d = 0.381$     (10)

EXAMPLE 4

$F_{NO} = 1:6.5;\ f_M = 100.00;\ \omega = 28° \sim 22°.$

| Surface No. | r | d | n | ν |
|---|---|---|---|---|
| 1 | 19.129 | 8.57 | 1.51633 | 64.1 |
| 2 | 33.243 | 1.13 | | |
| 3 | 14.203 | 1.77 | 1.80518 | 25.4 |
| 4 | 11.518 | 16.98 | | |
| 5 | −11.518 | 1.77 | 1.80518 | 25.4 |
| 6 | −14.203 | 1.13 | | |
| 7 | −33.243 | 8.57 | 1.51633 | 64.1 |
| 8 | −19.129 | | | |

$f_1/f_M = f_4/f_M = 0.720$     (1)

$f_2/f_M = f_3/f_M = -1.063$     (2)

$r_3/f_M = -r_6/f_M = 0.142$     (3)

$d_4/f_M = 0.170$     (4)

$\sum_{i=1}^{4} \frac{1}{n_i \cdot f_i} = 0.0079$     (5)

$\left| \sum_{i=1}^{4} \frac{1}{\nu_i \cdot f_i} \right| = 0.00031$     (6)

$f_1/f_2 = f_4/f_3 = -0.677$     (7)

$r_1/f_M = -r_8/f_M = 0.191$     (8)

$r_1/r_4 = r_8 r_5 = 1.661$     (9)

$d_4/\Sigma d = 0.425$     (10)

EXAMPLE 5

$F_{NO} = 1:8;\ f_M = 100.00;\ \omega = 28° \sim 22°.$

| Surface No. | r | d | n | ν |
|---|---|---|---|---|
| 1 | 22.442 | 7.72 | 1.60738 | 56.8 |
| 2 | 45.927 | 1.28 | | |
| 3 | 19.918 | 2.38 | 1.80518 | 25.4 |
| 4 | 14.812 | 17.61 | | |
| 5 | −13.687 | 2.38 | 1.80518 | 25.4 |
| 6 | −18.467 | 1.28 | | |
| 7 | −45.384 | 7.72 | 1.60738 | 56.8 |
| 8 | −22.426 | | | |

$f_1/f_n = 0.640;\ f_4 f_M = 0.645$     (1)

$f_2/f_M = -0.899;\ f_3 f_M = -0.837$     (2)

$r_3/f_M = 0.199;\ -r_6/f_M = 0.185$     (4)

$d_4/f_M = 0.176$     (4)

$\sum_{i=1}^{4} \frac{1}{n_i \cdot f_i} = 0.0066$     (5)

-continued $\left| \sum_{i=1}^{4} \frac{1}{\nu_i \cdot f_i} \right| = 0.00036$     (6)

$f_1/f_2 = -0.711;\ f_4 f_3 = -0.771$     (7)

$r_1/f_M = 0.224;\ -r_8/f_M = 0.224$     (8)

$r_1/r_4 = 1.515;\ r_8/r_5 = 1.638$     (9)

$d_4 \Sigma d = 0.436$     (10)

As described above, the copying lens system of the present invention adopts a simple lens composition consisting of four elements in four units, which contributes greatly to reduction not only in size, but also in cost. Furthermore, this system which satisfies Conditions (1) and (2) and preferably also satisfies Conditions (3)–(10), is capable of covering a wide angle of no less than 25 degrees in terms of half-view angle ($\omega$), and still can copy over a wide magnification range of from life size to either enlarged or reduced size in a balanced way, with various aberrations being compensated for effectively.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A copying lens system which, in order from the object side, comprises:
   a first lens element of positive meniscus having a convex surface directed toward an object;
   a second lens element of negative meniscus having a convex surface directed toward said object;
   a third lens element of negative meniscus having a convex surface directed toward an image; and
   a fourth lens element of positive meniscus having a convex surface directed toward said image,
wherein said copying lens system satisfies the following conditions:

$-0.79 < f_1/f_2,\ f_4/f_3 < -0.67$     (7)

$0.19 < r_1/f_M,\ -r_8/f_M < 0.28$     (8)

$1.46 < r_1/r_4,\ r_8/r_5 < 1.67$     (9)

$0.36 < d_4/\Sigma d < 0.45$     (10)

where
 $f_M$: a focal length of overall said copying lens system;
 $f_i$: a focal length of an i-th lens element.
 $r_i$: a radius of curvature of an i-th surface as counted from said object side; and
 $d_i$: a thickness of said i-th lens element as counted from said object side, or an axial distance between said i-th lens element and an (i+1)-th lens element.
 $\Sigma d$: an overall length of said copying lens system.

2. A copying lens system according to claim 1 which further satisfies the following conditions:

$0.55 < f_1/f_M,\ f_4/f_M < 0.75$     (1)

$-1.20 < f_2/f_M,\ f_3/f_M < -0.80$     (2)

3. A copying lens system according to claim 2 which further satisfies the following conditions:

$$0.004 < \sum_{i=1}^{4} \frac{1}{n_i \cdot f_i} < 0.009 \quad (5)$$

$$\left| \sum_{i=1}^{4} \frac{1}{v_i \cdot f_i} \right| < 0.0005 \quad (6)$$

where
- $n_i$: a refractive index of said i-th lens element at the d-line;
- $v_i$: an Abbe number of said i-th lens element.

4. A copying lens system according to claim 3 wherein said first lens element and said fourth lens element have the same geometric shape, and are disposed symmetrically with respect to a central diaphragm stop, and wherein said second lens element and said third lens element have the same geometric shape, and are disposed symmetrically with respect to said central diaphragm stop, thereby providing an overall symmetrical configuration.

5. A copying lens system according to claim 2 wherein said first lens element and said fourth lens element have the same geometric shape, and are disposed symmetrically with respect to a central diaphragm stop, and wherein said second lens element and said third lens element have the same geometric shape, and are disposed symmetrically with respect to said central diaphragm stop, thereby providing an overall symmetrical configuration.

6. A copying lens system according to claim 1 which further satisfies the following conditions:

$$0.12 < r_3/f_M, -r_6/f_M < 0.35 \quad (3)$$

$$0.1 < d_4/f_M < 0.2 \quad (4)$$

7. A copying lens system according to claim 6 wherein said first lens element and said fourth lens element have the same geometric shape, and are disposed symmetrically with respect to a central diaphragm stop, and wherein said second lens element and said third lens element have the same geometric shape, and are disposed symmetrically with respect to said central diaphragm stop, thereby providing an overall symmetrical configuration.

8. A copying lens system according to claim 1 which further satisfies the following conditions:

$$0.004 < \sum_{i=1}^{4} \frac{1}{n_i \cdot f_i} < 0.009 \quad (5)$$

$$\left| \sum_{i=1}^{4} \frac{1}{v_i \cdot f_i} \right| < 0.0005 \quad (6)$$

where
- $n_i$: a refractive index of said i-th lens element at the d-line;
- $v_i$: an Abbe number of said i-th lens element.

9. A copying lens system according to claim 8 wherein said first lens element and said fourth lens element have the same geometric shape, and are disposed symmetrically with respect to a central diaphragm stop, and wherein said second lens element and third lens element have the same geometric shape, and are disposed symmetrically with respect to said central diaphragm stop, thereby providing an overall symmetrical configuration.

10. A copying lens system according to claim 1 wherein said first lens element and said fourth lens element have the same geometric shape, and are disposed symmetrically with respect to a central diaphragm stop, and wherein said second lens element and said third lens element have the same geometric shape, and are disposed symmetrically with respect to said central diaphragm stop, thereby providing an overall symmetrical configuration.

11. A copying lens system which, in order from the object side, comprises:
- a first lens element of positive meniscus having a convex surface directed toward an object;
- a second lens element of negative meniscus having a convex surface directed toward said object;
- a third lens element of negative meniscus having a convex surface directed toward an image; and
- a fourth lens element of positive meniscus having a convex surface directed toward said image, wherein said copying lens system satisfies the following conditions:

$$0.61 < f_1/f_M, f_4/f_M < 0.75 \quad (1)$$

$$-1.20 < f_2/f_M, f_3/f_M < -0.80 \quad (2)$$

where
- $f_M$: a focal length of overall said copying lens system;
- $f_i$: a focal length of an i-th lens element.

12. A copying lens system according to claim 11 wherein said first lens element and said fourth lens element have the same geometric shape, and are disposed symmetrically with respect to a central diaphragm stop, and wherein said second lens element and said third lens element have the same geometric shape, and are disposed symmetrically with respect to said central diaphragm stop, thereby providing an overall symmetrical configuration.

* * * * *